(12) United States Patent
Kress et al.

(10) Patent No.: US 11,303,854 B2
(45) Date of Patent: Apr. 12, 2022

(54) CHANNEL INSPECTION AND/OR MAINTENANCE SYSTEM

(71) Applicant: iPEK International GmbH, Sulzberg (DE)

(72) Inventors: Michael Kress, Kempten (DE); Harald Kaderabek, Buchenberg (DE); Fabian Zahnd, Kempten (DE); Dominik Pomp, Kempten (DE)

(73) Assignee: iPEK International GmbH, Sulzberg (DE)

( * ) Notice: Subject to any disclaimer, the term of this patent is extended or adjusted under 35 U.S.C. 154(b) by 0 days.

(21) Appl. No.: 16/427,971

(22) Filed: May 31, 2019

(65) Prior Publication Data

US 2019/0373223 A1 Dec. 5, 2019

(51) Int. Cl.
*H04N 7/18* (2006.01)
*H04N 7/10* (2006.01)
(Continued)

(52) U.S. Cl.
CPC ............. *H04N 7/185* (2013.01); *H04N 7/015* (2013.01); *H04N 7/10* (2013.01); *H04N 7/188* (2013.01)

(58) Field of Classification Search
CPC ......... H04N 7/185; H04N 7/10; A61B 5/7225
(Continued)

(56) References Cited

U.S. PATENT DOCUMENTS

2003/0128301 A1* 7/2003 Tarr ..................... G11B 27/034
 348/722
2012/0069172 A1* 3/2012 Hudritsch .......... H04N 5/23238
 348/84
2015/0366442 A1* 12/2015 Amling ............. A61B 1/00193
 348/47

FOREIGN PATENT DOCUMENTS

DE 20 2014 102 384 U1 8/2015
DE 20 2017 104 428 U1 9/2017
(Continued)

OTHER PUBLICATIONS

Extended European search report issued by the European Patent Office for corresponding European Patent Application No. 18175638.8-1208, dated Aug. 10, 2018, with an English translation.
(Continued)

*Primary Examiner* — Jeffery A Williams
(74) *Attorney, Agent, or Firm* — Myers Wolin, LLC

(57) ABSTRACT

An inspection system comprising an inspection and/or maintenance device and a monitoring device is provided. The inspection and/or maintenance device is operationally connected to the monitoring device via a wired communication connection, and the inspection and/or maintenance device has at least one image recording system, the at least one image recording system provides digital video data and the inspection and/or maintenance device has a transmitting device which is operationally coupled to the at least one image recording system and to the communication connection, and (Continued)

the monitoring device has a receiving device which is operationally coupled to the communication connection.

The transmitting device and the receiving device are adapted to transmit the digital video data at least via a sub-section of the communication connection in an analog manner according to an AHD standard. Also provided is a method for transmitting digital video data is provided.

4 Claims, 3 Drawing Sheets

(51) Int. Cl.
  *A61B 5/00* (2006.01)
  *H04N 7/015* (2006.01)
(58) Field of Classification Search
  USPC .......................................................... 348/143
  See application file for complete search history.

(56) References Cited

FOREIGN PATENT DOCUMENTS

| WO | 2014/129854 A1 | 8/2014 | |
| WO | WO-2014129854 A1 * | 8/2014 | ............... H04N 7/18 |

OTHER PUBLICATIONS

Patryk Gańko, "Analog High Definition CCTV (AHD) by NOVUS", Apr. 18, 2016, retrieved from the internet: [URL: http://www.novuscctv.com/sites/default/files/reklamy/pdf/Zabezpieczenia_press_Analog_High_Definition_AHD_NOVUS_EN.pdf] retrieved on Aug. 3, 2018.

* cited by examiner

CHANNEL INSPECTION AND/OR MAINTENANCE SYSTEM

CROSS REFERENCE TO RELATED APPLICATION

The present application claims priority of European Application No. 18 175 638.8, filed Jun. 1, 2018, the contents of which are incorporated herein by reference.

FIELD OF THE INVENTION

The invention relates to a sewer inspection and/or maintenance system comprising an inspection and/or maintenance device and a monitoring device, wherein the inspection and/or maintenance device and the monitoring device are adapted to transmit digital video data provided by an image recording system. Furthermore, the invention relates to a correspondingly designed method for transmitting digital image data.

BACKGROUND OF THE INVENTION

In order to carry out pipe or sewer inspections or pipe or sewer maintenance, it is known to use so-called inspection and/or maintenance devices which can be introduced into the pipe to be inspected or maintained and can be moved or shifted in the pipe. In this case, the inspection and/or maintenance device includes an image recording system, for instance a video camera, wherein the received video data are transmitted via a cable through the sewer or the pipe to a monitoring device.

When analog SD cameras are used, the analog video image is transmitted for example via a two-wire lead, a twisted-pair lead, a coaxial lead or a fiber optic line. These leads are usually located inside a cable in which further leads can be present for the voltage supply and/or transmission of further data.

In the case of high-resolution video cameras (HD cameras), the leads must meet substantially higher quality requirements, so that a high-resolution video signal can be transmitted. The high-resolution video signal is transmitted digitally. Depending upon the available bandwidth for the transmission, the digital video signal must be compressed before the transmission, but this can lead to compression artifacts. Moreover, due to the processing of the video data which is necessary for this, undesirable latencies can occur. Furthermore, the digital transmission of video data is generally relatively costly, not least because higher-quality leads must be used.

Object of the Invention

The object of the present invention, therefore, is to provide solutions which facilitate a simple and cost-effective transmission of digital video data in an inspection and/or maintenance system. In particular, it is an object of the invention to transmit high-resolution, digital video data simply and cost-effectively in an inspection and/or maintenance system.

Solution According to the Invention

According to the invention, this object is achieved by an inspection and/or maintenance system as well as a method according to the independent claims. Advantageous embodiments of the invention are set out in the respective dependent claims.

Accordingly, an inspection system comprising an inspection and/or maintenance device and a monitoring device is provided, wherein the inspection and/or maintenance device is operationally connected to the monitoring device via a wired communication connection, and the inspection and/or maintenance device has at least one image recording system, the at least one image recording system providing digital video data, and wherein
- the inspection and/or maintenance device has a transmitting device which is operationally coupled to the at least one image recording system and to the communication connection, and
- the monitoring device has a receiving device which is operationally coupled to the communication connection, wherein the transmitting device and the receiving device are adapted to transmit the digital video data at least via a sub-section of the communication connection in an analog manner according to an AHD (analog high definition) standard.

The digital video data can comprise high-resolution digital video data.

The transmitting device can be adapted to transmit the digital video data provided by the image recording system
- as analog video data according to the AHD standard, wherein a transducer of the transmitting device is adapted to convert the digital video data into analog video data according to the AHD standard, or
- to transmit them in digital form according to a predetermined digital transmission standard.

It is advantageous if the receiving device is adapted
- to receive the analog video data according to the AHD standard, or
- to receive digital video data according to a predetermined digital transmission standard, wherein a transducer of the receiving device is adapted to convert the received video data into a predetermined digital or analog output format.

It is also advantageous if the transmitting device and the receiving device are adapted to transmit the digital video data
- via a first sub-section of the communication connection in an analog manner according to an AHD standard and via a second sub-section of the communication connection digitally according to a digital transmission standard, or
- to transmit them via a second sub-section of the communication connection in an analog manner according to an AHD standard and via a first sub-section of the communication connection digitally according to a digital transmission standard.

In the communication connection, a converter can be arranged between the first sub-section and the second sub-section and is adapted
- to convert the analog video data received according to the AHD standard into digital video data, or
- to convert the received digital video data into analog video data according to the AHD standard.

The communication connection can comprise a control channel, preferably a bidirectional control channel, via which control data can be exchanged between the inspection and/or maintenance device and the monitoring device.

Furthermore, a method is provided for transmitting digital video data via a wired communication connection between an inspection and/or maintenance device and a monitoring device of an inspection system, wherein
  at least one image recording system of the inspection and/or maintenance device provides digital video data for transmission, and
  the digital video data are transmitted between a transmitting device of the inspection and/or maintenance device and a receiving device of the monitoring device at least via a sub-section of the communication connection in an analog manner according to an AHD (analog high definition) standard.

It is advantageous if
  a transducer of the transmitting device converts the digital video data into analog video data according to the AHD standard and the transmitting device transmits the converted video data, or
  the transmitting device transmits the digital video data according to a predetermined digital transmission standard.

Furthermore, it can be advantageous if the receiving device
  receives the analog video data according to the AHD standard, or
  receives the digital video data according to a predetermined digital transmission standard,
wherein a transducer of the receiving device converts the received video data into a predetermined digital or analog output format.

The digital video data provided by the at least one image recording system can be transmitted
  via a first sub-section of the communication connection in an analog manner according to an AHD standard and via a second sub-section of the communication connection digitally according to a digital transmission standard, or
  via a second sub-section of the communication connection in an analog manner according to an AHD standard and via a first sub-section of the communication connection digitally according to a digital transmission standard.

In this case, it is advantageous if in the communication connection a converter can be arranged between the first sub-section and the second sub-section, wherein the converter converts
  the analog video data received according to the AHD standard into digital video data, or
  converts the received digital video data into analog video data according to the AHD standard.

A significant advantage of the present invention can be seen in the fact that already existing cables designed for the transmission of analog video data can be used in order to transmit the digital video data provided by an image recording device.

High-resolution digital video data (for instance full HD, 2K, 4K or 8K resolved video data) can also be transmitted in an analog manner and without loss of quality by the use of the AHD standard for the analog transmission of the digital video data.

A further advantage lies in the fact that the high-resolution digital video data provided by the image recording system can be transmitted in an analog manner on simple leads and coaxial cables over several hundred meters.

A further advantage lies in the fact that the video data does not have to be compressed before the transmission, so that on the one hand compression artifacts are avoided and on the other hand a latency-free transmission is possible.

Moreover, with the AHD standard a so-called control channel can be provided, by means of which the monitoring device of the inspection system can parameterize and control the camera of the inspection and/or maintenance device.

BRIEF DESCRIPTION OF THE DRAWINGS

Further details and features of the invention, as well as specific, advantageous exemplary embodiments of the invention, are apparent from the following description in connection with the drawings. In the drawings.

DETAILED DESCRIPTION OF THE INVENTION

The invention is described in greater detail with reference to a sewer inspection and/or maintenance system. The sewer inspection and/or maintenance system is designated below simply as an inspection system. The inspection and/or maintenance device of the inspection system according to the invention is designated below simply as an inspection device.

Figure 1:
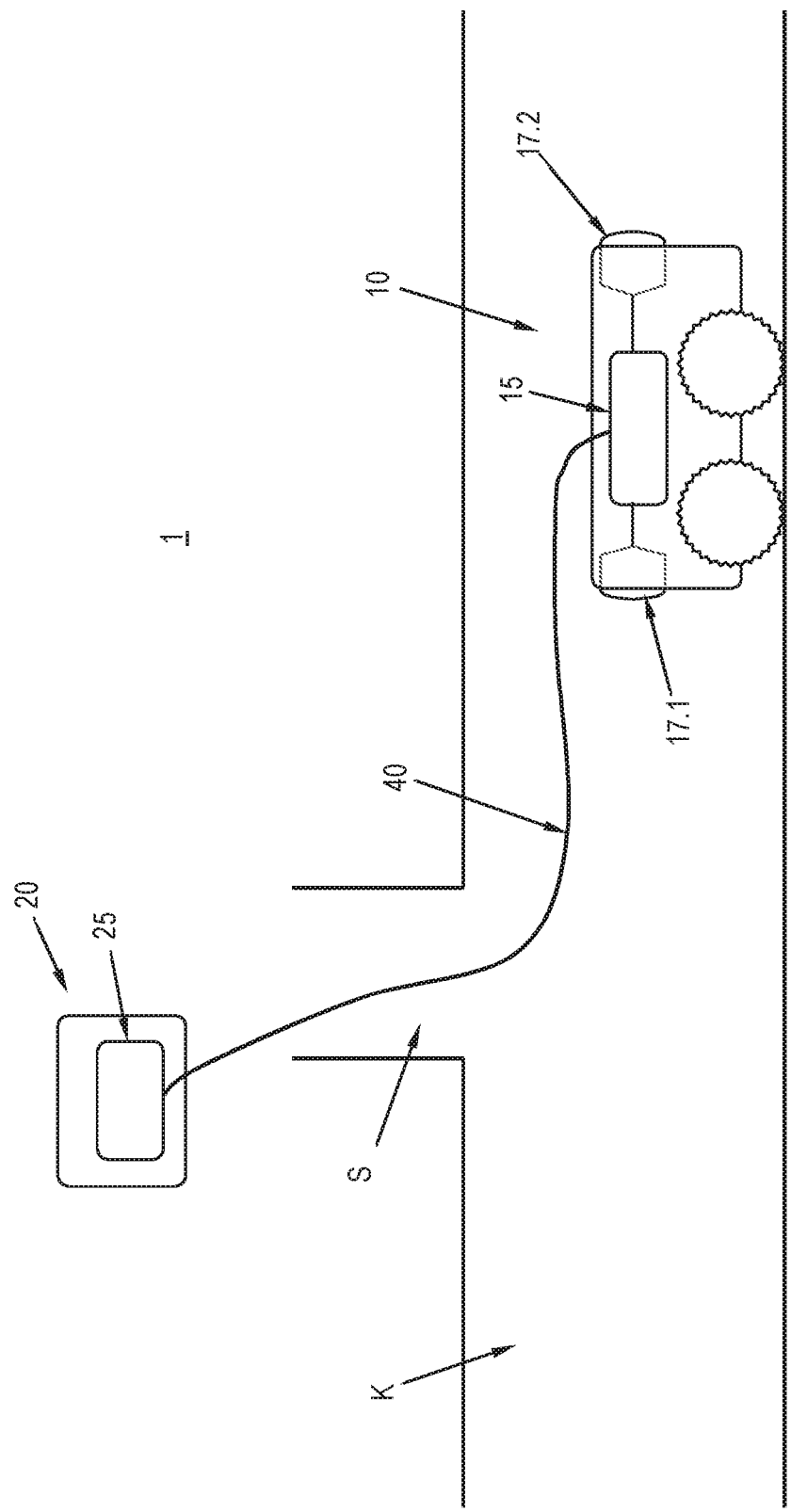
FIG. 1 shows an inspection and/or maintenance system according to the invention.

FIG. 1 shows an inspection system 1 according to the invention comprising an inspection device 10 and a monitoring device 20.

The inspection device 10 can be a carriage which can be moved in the sewer K or a sliding system which can be displaceable in the sewer K. The inspection device 10 is coupled or connected to the monitoring device 20 via a wired communication connection 40. The communication connection 40 can be realized, for example, by a coaxial cable or other leads suitable for the analog signal transmission, for instance a two-wire lead.

At least one image recording system is arranged on the inspection device 10, wherein in the embodiment of the inspection system 10 shown in FIG. 1 a first image recording system 17.1 and a second image recording system 17.2 are provided. The first image recording system 17.1 is an HD video camera directed towards the rear. The second image recording system 17.2 is an HD video camera directed towards the front. Digital high-resolution videos (full HD, 2K, 4K or 8K) can be recorded by the two video cameras 17.1 and 17.2 and can be provided for transmission via the cable 40 to the monitoring device 20.

Self-evidently, with the present invention inspection devices 10 are also possible which have only one image recording system or more than two image recording systems.

A transmitting device 15 which is operationally coupled to the image recording system or to the image recording systems 17.1 and 17.2 is arranged on the inspection device 10. The transmitting device 15 receives the digital high-resolution video data provided by the image recording system and transmits them to the monitoring device 20 according to the AHD standard. For this purpose, the transmitting device 15 has a transducer which converts the high-resolution digital video data of the image recording systems into analog video data according to the AHD standard. This conversion can take place without loss of time, so that a largely latency-free transmission of the analog video data is guaranteed.

Due to the analog transmission, even in the case of very high-resolution digital video data (for instance 4K or 8K), a compression can be omitted. As a result, on the one hand compression artifacts and on the other hand negative effects on the latency are avoided.

The monitoring device 20 has a receiving device 25 which is operationally coupled to the cable 40. The receiving device 25 is adapted to receive the analog video data transmitted according to the AHD standard. The received analog video data can then be displayed directly on the monitoring device 20 or can be converted into a specific digital or analog output format. If such a conversion of the received analog to video data is required, the receiving device 25 (or alternatively the control device 20) can have a transducer by which the analog video data received according to the AHD standard are converted into this predetermined digital or analog output format.

The communication connection 40 can have a control channel by which the monitoring device 20 according to the AHD standard can transmit control signals to the inspection device 10.

Figure 2:
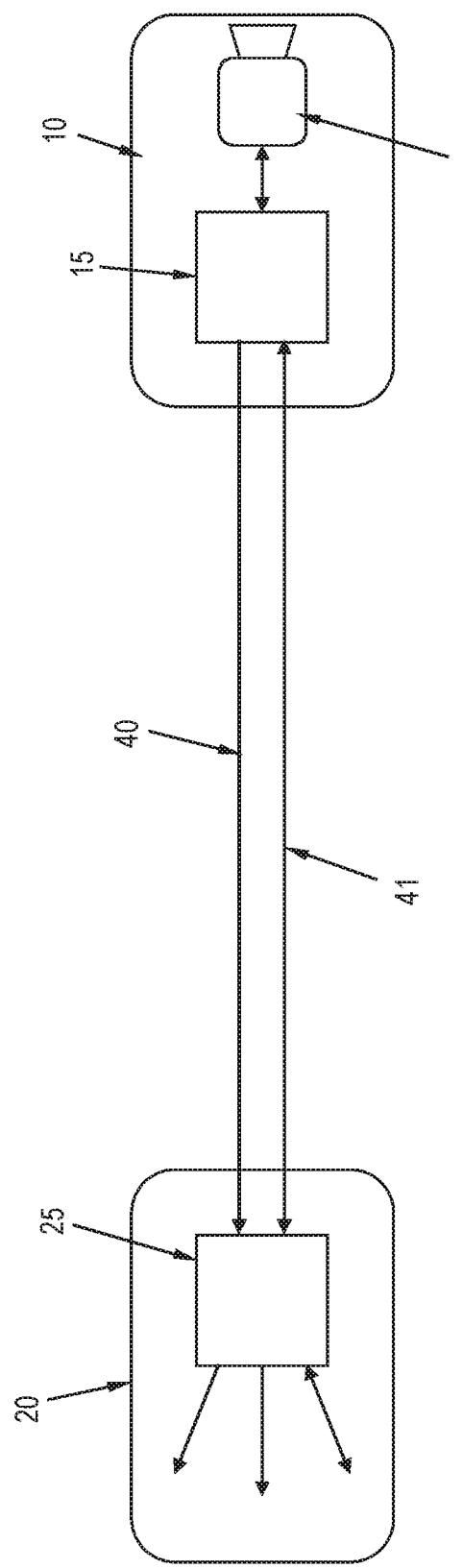
FIG. 2 shows a first exemplary embodiment for a transmission according to the invention of digital video data in an inspection and/or maintenance system.

FIG. 2 shows a first specific exemplary embodiment of an inspection system according to the invention.

The inspection system has an inspection device 10 and a monitoring device 20 which are coupled to one another via a communication connection 40. The inspection device 10 has a transmitting device 15 which on the one hand is coupled to an image recording system (for example, an HD video camera) and receives high-resolution video data from the image recording system 17, and which on the other hand is coupled to the communication connection 40.

The monitoring device 20 has a receiving device 25 which is coupled to the communication connection 40 and receives, via this communication connection 40, the analog video data transmitted by the transmitting device 15 of the inspection device 10 according to the AHD standard.

The receiving device 25 of the control device 20 provides the received analog video data for further processing, wherein the receiving device 25 can have corresponding outputs. For example, the receiving device 25 can provide the received analog video data to a digital output as digital video data. A corresponding transducer converts the received analog video data into the corresponding digital video data.

Furthermore, the receiving device 25 can also have connectors, by means of which monitoring and/or control data can be supplied to the receiving device or by means of which the receiving device 25 provides monitoring or control data. The control or monitoring data provided to the receiving device 25 can be transmitted via a control channel 41 of the communication connection 40 (the control channel 41 is shown in FIG. 2 separately from the communication connection 40—but in practice this control channel 41 is part of the communication connection 40) to the transmitting device 15 of the inspection device 10. The receiving device 25 and the transmitting device 15 are correspondingly configured in order to be able to transmit or receive these data. The monitoring device 20 can parameterize and control the inspection device 10, but in particular the image recording systems of the inspection device 10, by the control and/or monitoring data. Self-evidently, other units of the inspection device, for instance illumination devices, tool or the like, can also be controlled by these monitoring and/or control data.

Moreover, the transmitting device 15 can provide the monitoring device 20 with, for example, monitoring data via this control channel 41.

According to the exemplary embodiment shown in FIG. 2, high-resolution video data provided by the HD video camera 17 according to the AHD standard are transmitted as analog video data from the inspection device 10 to the monitoring device 20, wherein the video data are transmitted over the entire communication route between the transmitting device 15 and the receiving device 25 according to the AHD standard.

Figure 3:
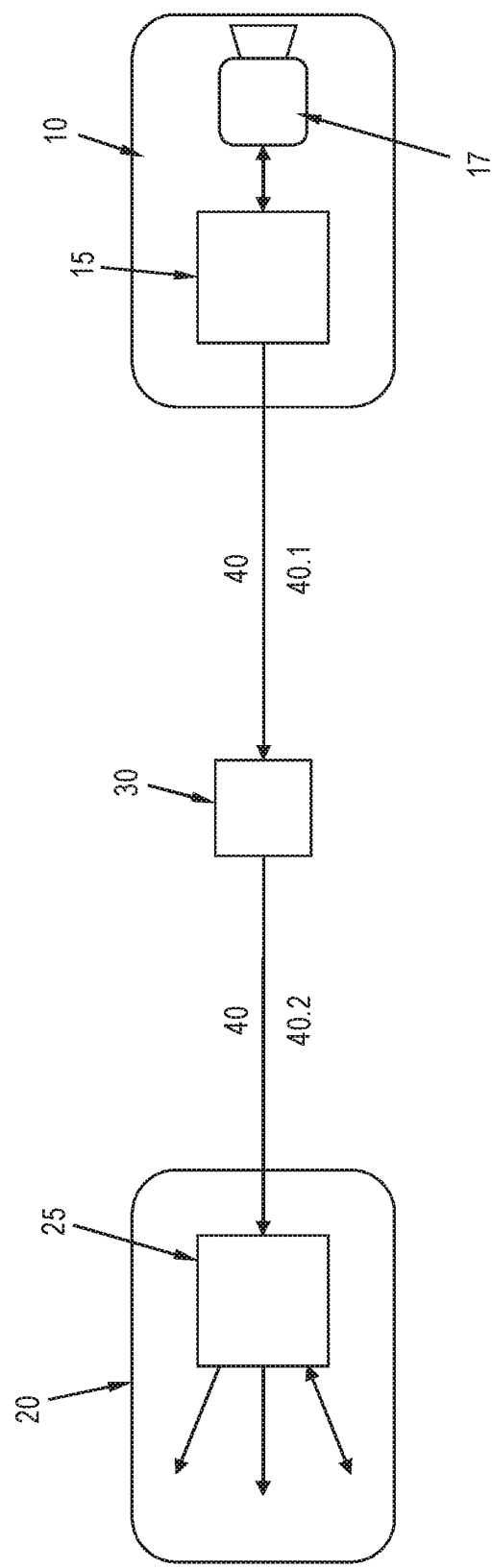
FIG. 3 shows a second exemplary embodiment for a transmission according to the invention of digital video data in an inspection and/or maintenance system.

FIG. 3 shows an alternative embodiment of an inspection system according to the invention, wherein the image data are transmitted according to the AHD standard as analog video data only via a sub-section of the communication connection 40 established between the transmitting device 15 and the receiving device 25.

In this case, a converter 30 is arranged in the communication connection 40 and divides the communication connection 40 into two sub-sections 40.1 and 40.2. In this case, the first sub-section 40.1 forms a communication connection between the transmitting device 15 and the converter 30. The second sub-section 40.2 forms the communication connection between the converter 30 and the receiving device 25.

According to the exemplary embodiment shown in FIG. 3, it is provided according to the invention that the high-resolution video data provided by the image recording system 17 are transmitted via one of the two sub-sections as analog video data according to the AHD standard. These video data can be transmitted via the respective other sub-section in digital form according to a predetermined digital transmission standard or alternatively in analog form according to an analog transmission standard different from the AHD standard.

Depending upon which sub-section 40.1, 40.2 transmits the high-resolution video data according to the AHD standard provided by the image recording system 17, the converter 30 is adapted to convert the analog video data received according to the AHD standard into digital video data, or to convert the received digital video data into analog video data according to the AHD standard.

For example, the high-resolution video data can be transmitted in an analog manner via the first sub-section 40.1 according to the AHD standard from the transmitting device 15 on the converter 30—the converter 30 then converts the received analog video data into digital video data and transmits them via the sub-section 40.2 to the receiving device 25.

In another variant, the transmitting device 15 can transmit the high-resolution video data unchanged, i.e. as high-resolution digital video data, via the first sub-section 40.1 to the converter 30—the converter 30 then converts the received digital video data according to the AHD standard into digital video data and transmits them via the second sub-section 40.2 to the receiving device 25.

Thus, it is possible for leads or cables, which are not suitable for the digital transmission of high-resolution video data, to be coupled to leads or cables which are suitable for the digital transmission of high-resolution video data. The transmission can take place according to the AHD standard via the leads or cables which are not suitable for the digital transmission of high-resolution video data.

In yet another embodiment of the invention, the high-resolution video data provided by the image recording system 17 can be transmitted via two sub-sections 40.1 and 40.2 as analog video data according to the AHD standard. In this case, the converter 30 can be configured in order to amplify and optionally to condition the analog video data or video signals received according to the AHD standard and to transmit the amplified and optionally conditioned video data or video signals via the second sub-section 40.2 to the receiving device 25. Thus, particularly wide ranges are possible with the AHD standard.

REFERENCES 1 inspection and/or maintenance system
10 inspection and/or maintenance device (for example carriage, flushing nozzle, sliding camera) of the inspection and/or maintenance system 1
15 transmitting device or transmitter of the inspection and/or maintenance device 10
17 image recording system
17.1, 17.2 image recording system
20 monitoring device of the inspection and/or maintenance system 1
25 receiving device or receiver of the monitoring device 20
30 converter
40 wired communication connection, for example data cable
40.1, 40.2 sub-sections of the communication connection 40
41 control channel
K channel
S channel shaft

The invention claimed is:

1. A sewer inspection and/or maintenance system (1) comprising an inspection and/or maintenance device (10), wherein the inspection and/or maintenance device (10) is a carriage which is movable in a sewer (K), and a monitoring device (20), wherein the monitoring device (20) is located outside the sewer (K), wherein the inspection and/or maintenance device (10) is operationally connected to the monitoring device (20) via a wired communication connection (40), and the inspection and/or maintenance device (10) has at least one image recording system (17; 17.1; 17.2), the at least one image recording system (17; 17.1; 17.2) providing digital video data, and wherein
the inspection and/or maintenance device (10) has a transmitting device (15) which is operationally coupled to the at least one image recording system (17; 17.1; 17.2) and to the communication connection (40), and
the monitoring device (20) has a receiving device (25) which is operationally coupled to the communication connection (40), and wherein:
the transmitting device (15) and the receiving device (25) are adapted to transmit the digital video data at least via a sub-section (40.1; 40.2) of the communication connection (40) in an analog manner according to an AHD (analog high definition) standard,
a transducer of the transmitting device (15) is adapted to convert the digital video data into analog video data according to the AHD such that a largely latency-free transmission of the analog video data is guaranteed,
the receiving device (25) comprises connectors, by means of which monitoring and/or control data can be supplied to the receiving device (25), wherein the monitoring and/or control data provided to the receiving device (25) can be transmitted via a control channel (41) of the communication connection (40) to the transmitting device (15), and
wherein the receiving device (25) is adapted:
to receive the analog video data according to the AHD standard, or
to receive digital video data according to a predetermined digital transmission standard,
and wherein:
a transducer of the receiving device (25) is adapted to convert the received video data into a predetermined digital or analog output format,
the transmitting device (15) and the receiving device (25) are adapted to transmit the digital video data via a first sub-section (40.1) of the communication connection (40) in an analog manner according to an AHD standard and via a second sub-section (40.2) of the communication connection (40) digitally according to a digital transmission standard,
in the communication connection (40) a converter (30) is arranged between the first sub-section (40.1) and the second sub-section (40.2) and is adapted to convert the analog video data received according to the AHD standard into digital video data,
the converter (30) is arranged between the inspection and/or maintenance device (10) and the monitoring device (20), and
the first sub-section (40.1) is a first cable, and the second sub-section (40.2) is a second cable, wherein the second cable is adapted to a digital transmission of high-resolution video data.

2. The sewer inspection and/or maintenance system according to claim 1, wherein the digital video data comprise high-resolution digital video data.

3. The sewer inspection and/or maintenance system of claim 1, wherein the control channel (41) is a bidirectional control channel (41) via which control data can be exchanged between the inspection and/or maintenance device (10) and the monitoring device (20).

4. A method for transmitting digital video data via a wired communication connection (40) between an inspection and/or maintenance device (10) and a monitoring device (20) of a sewer inspection and/or maintenance system (1), wherein the inspection and/or maintenance device (10) is a carriage which is movable in a sewer (K), and the monitoring device (20) is located outside the sewer (K), wherein
at least one image recording system (17; 17.1; 17.2) of the inspection and/or maintenance device (10) provides digital video data for transmission, and
the digital video data are transmitted between a transmitting device (15) of the inspection and/or maintenance device (10) and a receiving device (25) of the monitoring device (20) at least via a sub-section (40.1; 40.2) of the communication connection (40) in an analog manner according to an AHD (analog high definition) standard,
a transducer of the transmitting device (15) converts the digital video data into analog video data according to the AHD standard such that a largely latency-free transmission of the analog video data is guaranteed, and
the receiving device (25) comprises connectors, by means of which monitoring and/or control data is supplied to the receiving device (25), wherein a control channel (41) of the communication connection (40) transmits the monitoring and/or control data provided to the receiving device (41) to the transmitting device (15), wherein the receiving device (25)
receives the analog video data according to the AHD standard, or receives the digital video data according to a predetermined digital transmission standard, and wherein:

a transducer of the receiving device (25) converts the received video data into a predetermined digital or analog output format, the digital video data provided by the at least one image recording system (17; 17.1; 17.2) are transmitted via a first sub-section (40.1) of the communication connection (40) in an analog manner according to an AHD standard and via a second sub-section (40.2) of the communication connection (40) digitally according to a digital transmission standard, in the communication connection (40) a converter (30) is arranged between the first sub-section (40.1) and the second sub-section (40.2), wherein the converter converts the analog video data received according to the AHD standard into digital video data, and the first sub-section (40.1) is a first cable, and the second sub-section (40.2) is a second cable, wherein the second cable is adapted to a digital transmission of high-resolution video data.

\* \* \* \* \*

UNITED STATES PATENT AND TRADEMARK OFFICE
CERTIFICATE OF CORRECTION

PATENT NO. : 11,303,854 B2
APPLICATION NO. : 16/427971
DATED : April 12, 2022
INVENTOR(S) : Kress et al.

Page 1 of 1

It is certified that error appears in the above-identified patent and that said Letters Patent is hereby corrected as shown below:

On the Title Page

The following foreign application priority data should be added:
(30) Foreign Application Priority Data
June 1, 2018 (EP)...............18 175 638.8

Signed and Sealed this
Eleventh Day of October, 2022

Katherine Kelly Vidal
*Director of the United States Patent and Trademark Office*